US009736534B2

(12) United States Patent
Kharitonsky et al.

(10) Patent No.: US 9,736,534 B2
(45) Date of Patent: Aug. 15, 2017

(54) PERSISTENT REVIEW BUFFER (71) Applicant: Cisco Technology, Inc., San Jose, CA (US)

(72) Inventors: Dany Kharitonsky, Jerusalem (IL); Sara Novogrodsky, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 101 days.

(21) Appl. No.: 14/436,902

(22) PCT Filed: Oct. 27, 2013

(86) PCT No.: PCT/IB2013/059695
§ 371 (c)(1),
(2) Date: Apr. 20, 2015

(87) PCT Pub. No.: WO2014/072872
PCT Pub. Date: May 15, 2014

(65) Prior Publication Data
US 2015/0289010 A1    Oct. 8, 2015

(30) Foreign Application Priority Data
Nov. 8, 2012 (GB) .................................. 1220141.4

(51) Int. Cl.
H04N 5/92    (2006.01)
H04N 21/44    (2011.01)
(Continued)

(52) U.S. Cl.
CPC ....... H04N 21/44004 (2013.01); H04N 5/907 (2013.01); H04N 21/4331 (2013.01);
(Continued)

(58) Field of Classification Search
CPC ............. H04N 21/44004; H04N 5/907; H04N 21/4331; H04N 21/4334; H04N 21/4383;
(Continued)

(56) References Cited

U.S. PATENT DOCUMENTS 6,971,121 B2    11/2005    West et al.
7,454,120 B2    11/2008    Putterman et al.
(Continued)

FOREIGN PATENT DOCUMENTS

| EP | 1367824 | 12/2003 |
|---|---|---|
| EP | 2538691 | 12/2012 |
| WO | WO2012112581 | 8/2012 |

OTHER PUBLICATIONS

PCT/IB2013/059695 International Search Report dated Mar. 27, 2014.
(Continued)

*Primary Examiner* — David Harvey
(74) *Attorney, Agent, or Firm* — Samuel M. Katz; David Zviel (57) ABSTRACT

A method of content recording and playback is carried out in a receiving device by selecting one of a plurality of digital content streams (80, 82, 84), which have respective distribution arrangements. A content segment (90) of a review buffer (88) is established and configured for the one content stream. While recording the one content stream in the review buffer (90), a content source change operation is performed to record another content stream in the review buffer (88) by discontinuing recording of the one content stream, and iterating establishing, configuring and recording with a new content segment (92). Recorded content of the content segment (90) and new content segment (92) are stored in respective data stores (102, 100). The content streams may be replayed in an order or a reverse order of recording
(Continued)

thereof by retrieving data from respective content segments or data stores. Related apparatus is also described.

20 Claims, 8 Drawing Sheets (51) Int. Cl.
H04N 21/433 (2011.01)
H04N 21/4335 (2011.01)
H04N 21/438 (2011.01)
H04N 21/845 (2011.01)
H04N 5/907 (2006.01)
H04N 21/4147 (2011.01)
H04N 21/432 (2011.01)

(52) U.S. Cl.
CPC ..... H04N 21/4334 (2013.01); H04N 21/4335 (2013.01); H04N 21/4383 (2013.01); H04N 21/8456 (2013.01); H04N 21/4147 (2013.01); H04N 21/4325 (2013.01)

(58) Field of Classification Search
CPC ........... H04N 21/8456; H04N 21/4335; H04N 21/4147; H04N 21/4325
See application file for complete search history.

(56) References Cited

U.S. PATENT DOCUMENTS

| | | | |
|---|---|---|---|
| 7,620,294 B2 | 11/2009 | Green et al. | |
| 7,627,227 B2 | 12/2009 | Evans et al. | |
| 7,725,919 B1* | 5/2010 | Thiagarajan | H04N 5/76 725/101 |
| 7,848,613 B2 | 12/2010 | Osborne | |
| 7,962,942 B1 | 6/2011 | Craner | |
| 8,701,147 B2* | 4/2014 | Thomas | G06F 3/1415 725/93 |
| 9,043,822 B1* | 5/2015 | Calzone | H04N 21/6587 725/14 |
| 9,241,125 B2* | 1/2016 | Potrebic | H04N 5/76 |
| 2003/0093792 A1* | 5/2003 | Labeeb | H04N 7/163 725/46 |
| 2003/0105918 A1* | 6/2003 | Plourde, Jr. | G06F 17/30017 711/112 |
| 2003/0110514 A1* | 6/2003 | West | H04N 5/76 725/134 |
| 2003/0195978 A1* | 10/2003 | Fellenstein | H04L 29/06027 709/231 |
| 2005/0138659 A1* | 6/2005 | Boccon-Gibod | H04H 60/27 725/58 |
| 2005/0262534 A1* | 11/2005 | Bontempi | H04N 5/76 725/58 |
| 2006/0150225 A1* | 7/2006 | Hegg | H04N 5/76 725/89 |
| 2006/0182412 A1* | 8/2006 | Lefevre | H04N 5/76 386/282 |
| 2006/0257099 A1* | 11/2006 | Potrebic | H04N 5/76 386/344 |
| 2007/0110398 A1* | 5/2007 | Broeksteeg | G11B 27/105 386/241 |
| 2008/0098123 A1 | 4/2008 | Huang et al. | |
| 2008/0152311 A1* | 6/2008 | Levy | H04N 21/23431 386/247 |
| 2008/0244644 A1 | 10/2008 | McCausland | |
| 2009/0089832 A1* | 4/2009 | Kendall | H04N 5/76 725/38 |
| 2009/0104871 A1* | 4/2009 | Cho | H04N 5/50 455/3.04 |
| 2011/0274405 A1* | 11/2011 | Godar | H04N 21/44218 386/224 |
| 2012/0321278 A1* | 12/2012 | Walker | H04N 21/274 386/238 |
| 2014/0282759 A1* | 9/2014 | Harvey | H04N 21/4333 725/89 |

OTHER PUBLICATIONS

GB 1220141.4 Search and Examination Report dated May 20, 2013.
GB 1220141.4 Examination Report dated Mar. 16, 2015.

* cited by examiner

PERSISTENT REVIEW BUFFER

The present application is a 35 USC §371 application of PCT/IB2013/059695, filed on 27 Oct. 2013 and entitled "PERSISTENT REVIEW BUFFER", which was published in the English language with International Publication Number WO2014/072872, and which claims the benefit of priority from UK Patent Application 1220141.4, filed 8 Nov. 2012.

FIELD OF THE INVENTION

The present invention relates in general to communication systems, and particularly, but not exclusively, to content consumption systems.

BACKGROUND TO THE INVENTION

The meanings of certain acronyms and abbreviations used herein are given in Table 1.

TABLE 1

| Acronyms and Abbreviations | |
| --- | --- |
| MPEG | Moving Picture Experts Group |
| PCAT | Program Catalog |
| PVR | Personal Video Recorder |
| RB | Review Buffer |
| VF | Virtual File |

As digital transmission techniques have advanced, users are afforded the opportunity of navigating among many media content channels and services, such as movies, television shows, web content available from external media content providers as well as content located on the user's own system, such as a home set-top box, computer, and a variety of mobile communication devices. Moreover, the media content may arrive in many different protocols and formats. Review buffers in the user equipment enable media content to be captured and retained for subsequent playback.

U.S. Pat. No. 6,971,121 to West et al. discloses a system for managing and accessing media content received via a plurality of display channels and stored in a plurality of buffers in a storage device. The system associates the plurality of buffers with a composite buffer file.

U.S. Pat. No. 7,725,919 to Thiagarajan et al. discloses a short-term content buffer that maintains segments of audio and/or video content. The content segments are identified with segment identifiers, which enable management and playback of the content segments. In an embodiment, independent video content segments corresponding to a particular broadcast channel can be identified by associated content segment identifiers and the video content segments can be recorded together to generate a single recording of the content.

SUMMARY OF THE INVENTION

The present invention, in certain embodiments thereof, seeks to provide an improved content consumption system.

There is provided according to embodiments of the invention a method of content recording and playback, which is carried out by providing a review buffer in a receiving device, and selecting one of a plurality of digital content streams. The content streams have respective distribution arrangements, including a bit rate and, in the case of video content, a framing rate. The method is further carried out establishing a content segment of the review buffer for the one content stream, configuring the content segment in accordance with the distribution arrangement of the one content stream, recording the one content stream in the review buffer, and while recording the one content stream, executing a content source change operation to record another of the content streams in the review buffer by discontinuing recording of the one content stream, delimiting the content segment, and iterating the steps of establishing a content segment, configuring the content segment, and recording, using a new content segment as the content segment, using the other content stream as the one content stream, iterating the steps of storing the content segment and the new content segment in respective data stores, and playing back the content streams in an order of or a reverse order of recording thereof by retrieving data from respective content segments of the review buffer or from the respective data stores. Recording may be performed on a recording device that is separate from a content consumption device.

According to a further aspect of the method, the respective data stores are accessed using a virtual file system.

Yet another aspect of the method includes recording a third one of the content streams in a second review buffer while iteratively performing the step of recording the one content stream.

According to still another aspect of the method, the review buffer includes a plurality of review buffers having respective recorded content streams and playing back includes for each of the review buffers and their respective recorded content streams, the step of configuring a playback device to conform to the distribution arrangement of a current content stream responsively to a configuration of a current content segment.

An additional aspect of the method includes dynamically updating the retrieved data via a data network, and displaying the updated data.

According to yet another aspect of the method, a portion of the data stores is remote from the receiving device.

According to an aspect of the method, the digital content streams are received using a compression format.

According to a further aspect of the method, the digital content streams are received using a content protection scheme.

According to yet another aspect of the method, the digital content streams are encoded using an encryption scheme.

There is provided according to embodiments of the invention a recording apparatus, including a network interface that is connectable via a network to a plurality of content sources that are distributed as digital content streams. The content streams have respective distribution arrangements, including a bit rate and, in the case of video content, a framing rate. The apparatus includes a memory configured as a review buffer for storing data received via the content streams, a processor including logic circuitry for coordinating memory accesses in the review buffer, wherein the processor is cooperative with the memory for performing a method that is carried out by: selecting one of the content streams, establishing a content segment of the review buffer for the one content stream, configuring the content segment in accordance with the distribution arrangement of the one content stream, recording the one content stream in the review buffer, and while recording executing a content source change operation to record another of the content streams in the review buffer by discontinuing recording of the one content stream, delimiting the content segment, and iterating performing the steps of establishing a content segment, configuring the content segment, and recording, using a new content segment as the content segment and using the other content stream as the one content stream, and storing the content segment and the new content segment in respective data stores. The recording apparatus may be separate from a content consumption device that is used for playback.

A portion of the content streams may originate from sources that are located in a recording device or in another device that is accessible to the recording device via a data network or via a direct connection.

Another aspect of the apparatus includes a virtual file system management module, wherein the respective data stores are accessed using a virtual file system.

Yet another aspect of the apparatus includes recording a third one of the content streams in a second review buffer while iteratively recording the one content stream.

A further aspect of the apparatus includes playback circuitry for playing back the content streams in an order or a reverse order of recording thereof by retrieving data from respective content segments of the review buffer or from the respective data stores, wherein playing back includes for each of the recorded content streams: configuring the playback circuitry to conform to the distribution arrangement of a current content stream responsively to a configuration of a current content segment.

Another aspect of the apparatus includes dynamically updating the retrieved data via a data network, and displaying the updated data.

According to a further aspect of the apparatus, a portion of the data stores are remotely accessible via the network interface responsively to control signals from the processor.

Still another aspect of the apparatus includes a tuner for selection of the content sources, wherein the logic circuitry is operative for coordinating operations in the review buffer with tuner operations.

According to an additional aspect of the apparatus, the digital content streams are received using a compression format.

According to one aspect of the apparatus, the digital content streams are received using a content protection scheme.

According to one aspect of the apparatus, the digital content streams are encoded using an encryption scheme.

BRIEF DESCRIPTION OF THE DRAWINGS

For a better understanding of the present invention, reference is made to the detailed description of embodiments, by way of example, which is to be read in conjunction with the following drawings, wherein like elements are given like reference numerals, and wherein.

DETAILED DESCRIPTION OF EMBODIMENTS

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Aspects of the present invention may be embodied in software programming code, which is typically maintained in permanent storage, such as a computer readable medium. In a client/server environment, such software programming code may be stored on a client or a server. The software programming code may be embodied on any of a variety of known non-transitory tangible media for use with a data processing system, such as a diskette, hard drive, flash memory or CD-ROM. The code may be distributed on such media, or may be distributed to consumers from the memory or storage of one content consumption system over a network of some type to storage devices on other computer systems for use by consumers of such other systems.

System Architecture

Figure 1:
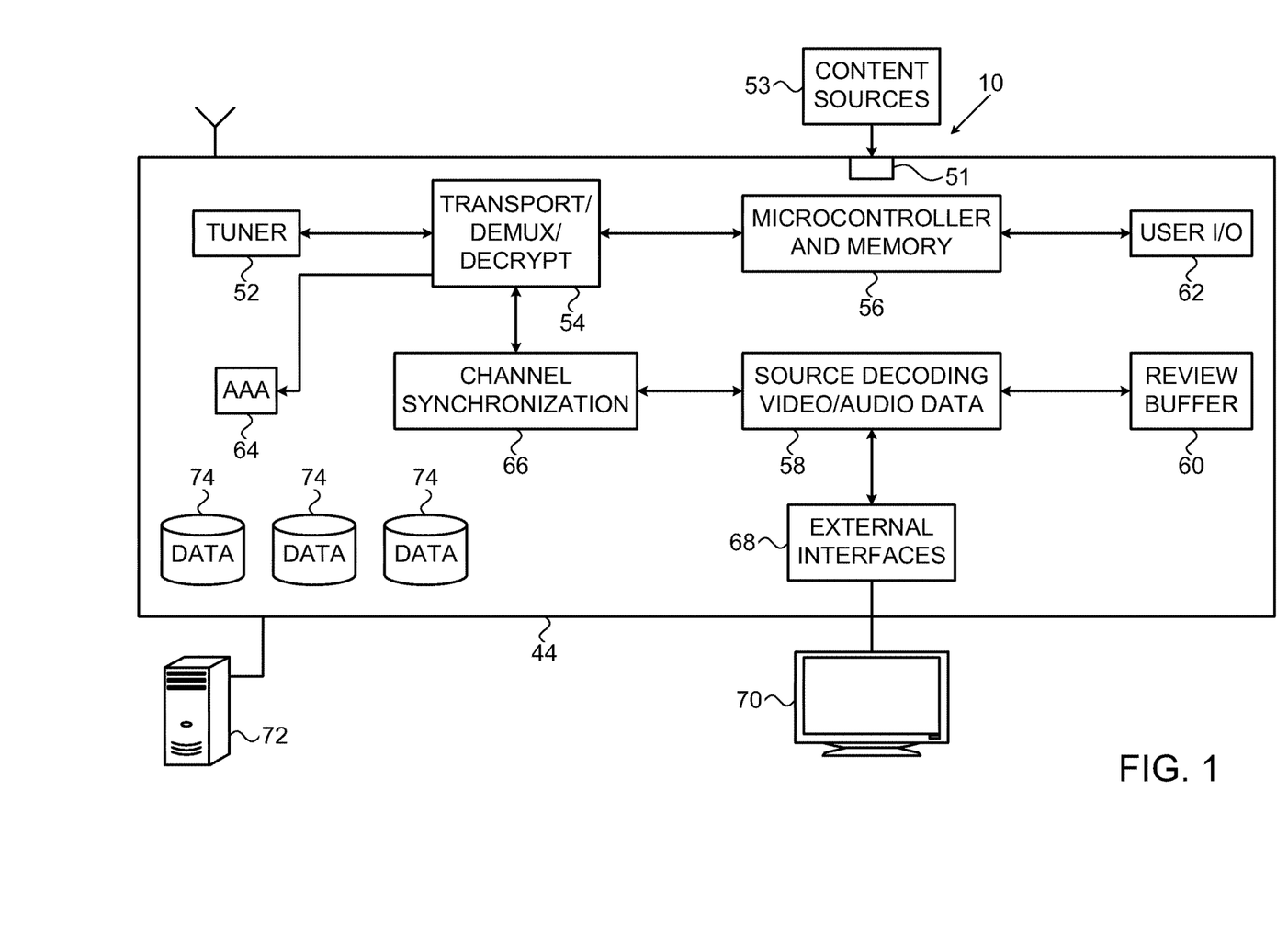
FIG. 1 is a schematic diagram of a system, which is constructed and operative in accordance with an embodiment of the invention.

Turning now to the drawings, reference is initially made to FIG. 1, which is a schematic diagram of a content consumption system 10, which is constructed and operative in accordance with an embodiment of the invention.

A receiving device 44 typically includes an input interface 51, e.g., a network interface, antenna, line input, and the like, for receiving content sources 53. The receiving device 44 may include one or more instances of a tuner 52, a transport demultiplexing and decryption module 54, which operates under control of a microcontroller 56, which has associated memory, a source decoder 58 and is coupled to a review buffer 60, which may be implemented as one or more review buffers. Although the review buffer 60 is shown as an integral unit in FIG. 1, it may be distributed among various types of accessible local and remote memory in many combinations, e.g., random access memory, hard disks, flash memory and cloud storage, and may be accessed via the interface 51. Such review buffers are usually referred to herein for convenience in the singular. A review buffer is a system-maintained storage area used to perform review of streaming content on video or audio streams, and is often intended as non-persistent storage. Alternatively, the review buffer may be used for persistent storage. A user I/O device 62 provides a user interface for accepting viewer commands such as content source change and playback requests, and for providing output information. The receiving device 44 is provided with a module 64 for performing authentication, authorization, and accounting functions. A synchronization component 66 deals with certain events that occur during a channel change sequence. In particular, when the review buffer is acquiring data, the synchronization component 66 appends the content of the new channel to the previously recorded content in the review buffer. In some embodiments, the synchronization component 66 may implement a delay, typically 10 seconds, in order to avoid having to manage a large number of review buffer segments of very small length. External interfaces 68 deliver suitably decoded and descrambled video to a display 70. The microcontroller 56 may include various hardware or software modules in many combinations for managing the review buffer, which are described below.

Review buffer functionality, also known as "instant rewind", enables "time shifting" of content, which is encoded using a codec and container, and stored on one or more devices. The codec may assume many forms, and the containers are not limited, for example to MPEG containers. As noted above, in the system 10 one or more review buffers are maintained, as represented in FIG. 1 by the review buffer 60. The review buffers store information from any number of content streams and from local sources, which could be located in the receiving device 44 or in an optional locally accessible device, such as a computer 72. When it is desired to retain the information in the review buffers, the interfaces 68 incorporate logic circuitry or software to write the data to any number of storage units 74, which may be integral with the receiving device 44 as shown in FIG. 1, or locally attached. While the review buffer 60 is shown to be integral with the receiving device 44 in FIG. 1, the review buffer 60 may be distributed among different devices and locations. The various data stores may store segments or portions of segments in many combinations, and be accessible using a virtual file system, in which case the interfaces 68 may incorporate a virtual file system management module, which can be realized as a software module or as specialized circuitry adapted to manage a virtual file system.

Figure 2:
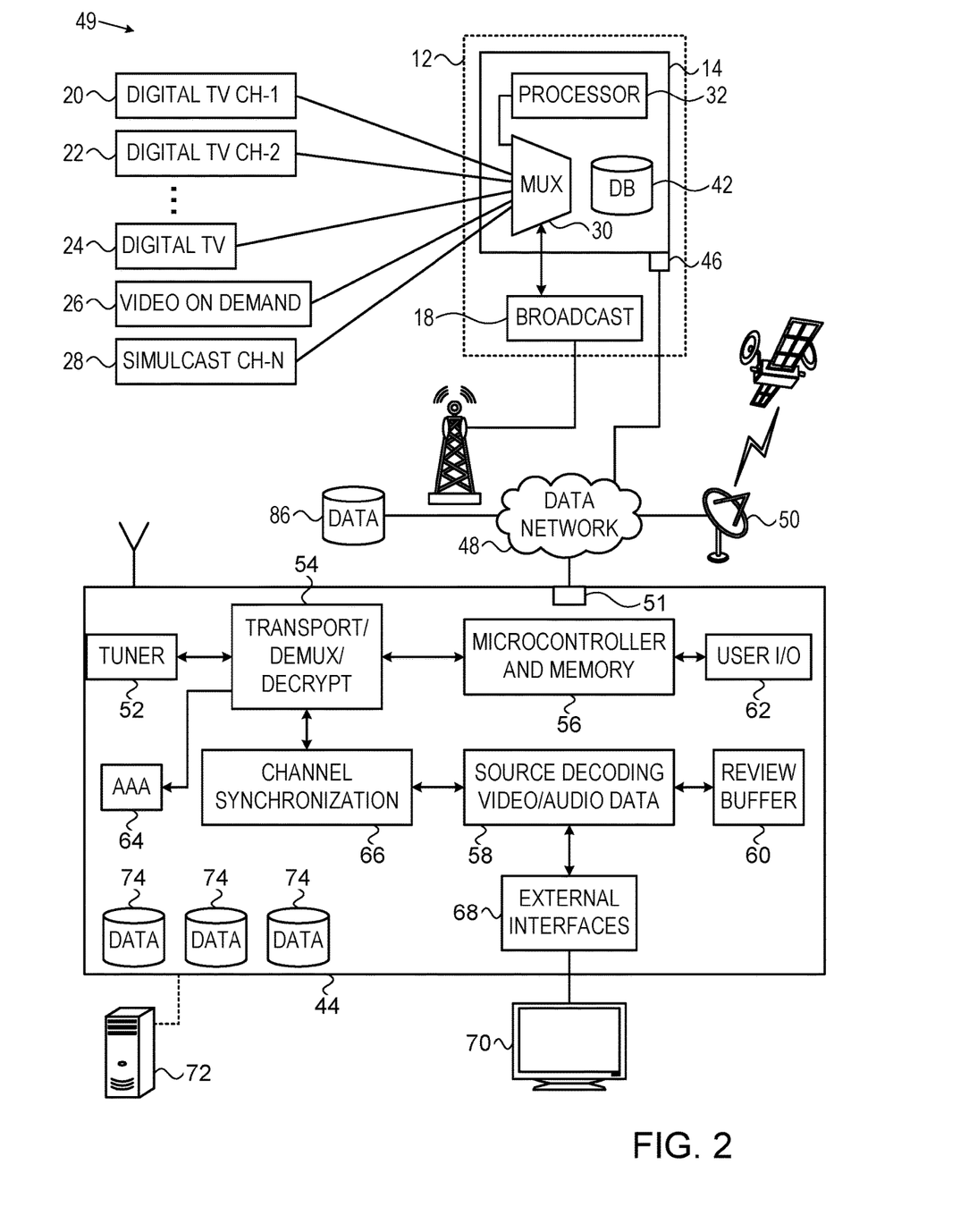
FIG. 2 is a schematic diagram of a system, which is constructed and operative in accordance with an alternate embodiment of the invention

Reference is now made to, FIG. 2, which is a schematic diagram of a content consumption system 49, which is constructed and operative in accordance with an alternate embodiment of the invention. The system 49 includes the receiving device 44, but is specialized for receiving content using a broadcast arrangement and is shown by way of example and not of limitation in order to demonstrate its versatility in processing many different forms of content under different operating conditions and from many different types of content sources.

The system 49 includes a head-end component 12, which includes a channel change server 14 coupled to a conventional broadcast head-end unit 18. The head-end component 12 may be adapted to a hybrid environment in which the channel change server 14 may process multiple content streams concurrently. The channel change server 14 may be realized as a hardware device, implemented as executable program code, or as a combination of hardware and software.

An exemplary mix of digital services received by the channel change server 14 comprises any number of video and audio channels CH-1 . . . CH-N, shown as digital television streams 20, 22, 24, a video-on-demand stream 26, and a digital simulcast stream 28. These and other types of digital content streams may be received in many combinations and constitute a hybrid multicast video distribution environment for the system 49. The content streams may have different distribution arrangements. For example, they may be distributed so as to arrive at different framing rates, different bit rates, in different video compression formats and utilizing different content protection schemes. They may be encrypted using various algorithms.

The channel change server 14 typically operates as a unicast server that delivers on a per request basis content of a given channel to the receiving device 44, which is typically a set-top box, but could be realized as a variety of consumer premises equipment. Alternatively, the fast channel change server 14 may be a multicast server. Delivery of the content may be achieved by any convenient method. For example the channel change server 14 may be provided with a network interface 46 to a data network 48. Alternatively, terrestrial radio or cable transmission or via a satellite receiving station 50 may be used.

Figure 3:
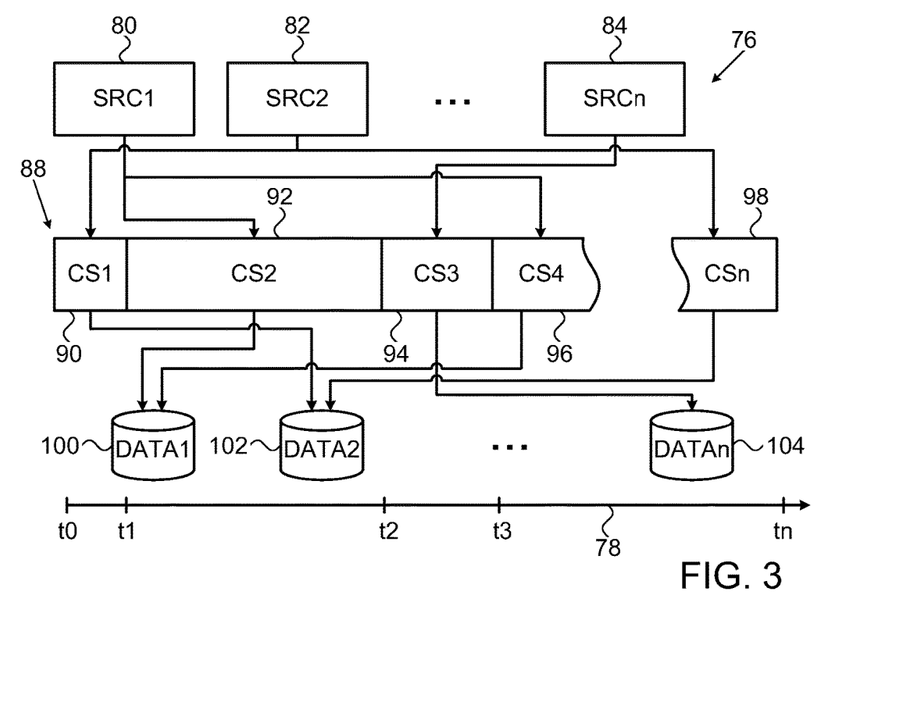
FIG. 3 is a schematic diagram of an exemplary review buffer arrangement, which is constructed and operative in accordance with an embodiment of the invention.

Reference is now made to FIG. 3, which is a schematic diagram of an exemplary review buffer arrangement 76, which is constructed and operative in accordance with an embodiment of the invention. For example, the elements of arrangement 76 may be implemented in the review buffer 60 (FIG. 1). The arrangement 76 expands the review buffer functionality to manage content from multiple sources, including file segments, broadcast and narrowcast channels. The content may be encoded using different codecs/containers, transmitted or streamed using different protocols, and it may be streamed from different devices. In any case, the arrangement 76 provides a consistent viewing experience during playback for all content types by adding the content to the review buffer according to configurable rules.

The arrangement 76 is now explained with reference to a time line 78. It is assumed that the receiving device can access any number of content sources 80, 82, 84 (SRC1, SRC2 . . . SRCn), which can be, for example, any of the streams 20, 22, 24 (FIG. 2). The receiving device may include multiple tuners, multiple interfaces to networks and external storage devices, and may receive the content sources 80, 82, 84 simultaneously. Additionally or alternatively a data store 86 for the content may be remotely accessible via the network 48. The content sources may include local sources of any known type. In any case, the user may select an active content source using known content source change techniques and record the active content source in a review buffer 88, which is segmented into content segments (CS1, CS2 . . . CSn). The content segments are established dynamically in accordance with content source change operations. Further description of the content segments is given below.

At time t0 of a session, the attention of the user is directed to content source 82, the current active content source, which is being recorded in a content segment 90 (CS1). Then, at time t1, a channel change operation is executed, and content source 80 becomes the active content source. A new content segment 92 is established and recording of the content source 80 continues until time t2, when another channel change operation is executed, and content source 84 becomes the active content source. Content segment 94 is established and records data from content source 84 until time t3. At time t3 another channel change operation is executed, and content source 80 is again chosen, and becomes the active content source. Content segment 96 is established and records data from content source 80. This sequence of events may iterate whenever the user changes channels until the end of the session at time tn, at which time content segment 98 is recording content source 82.

During forward playback the content segments of the review buffer 88 are accessed in the order that the content segments were added. The user's receiving device causes each segment to be accordingly played back. In the case of reverse playback, the content segments are accessed in reverse order and direction so as to achieve a reverse viewing effect. Alternatively, the user may select particular segments to play back in a forward or reverse direction, optionally using trick effects according to the capabilities of the receiving device and permissions applicable to particular content segments.

Optionally, in the event that prolonged storage of the data in the content segment 90 is desired, segments having data from common content sources are associated with respective data stores 100, 102, 104 (DATA1, DATA2. DATAn). For example content segments 92, 96, which contain data received from content source 80, are both written to data store 100. The content in the data stores 100, 102, 104 may be retrieved at a subsequent time.

Operation

Figure 4:
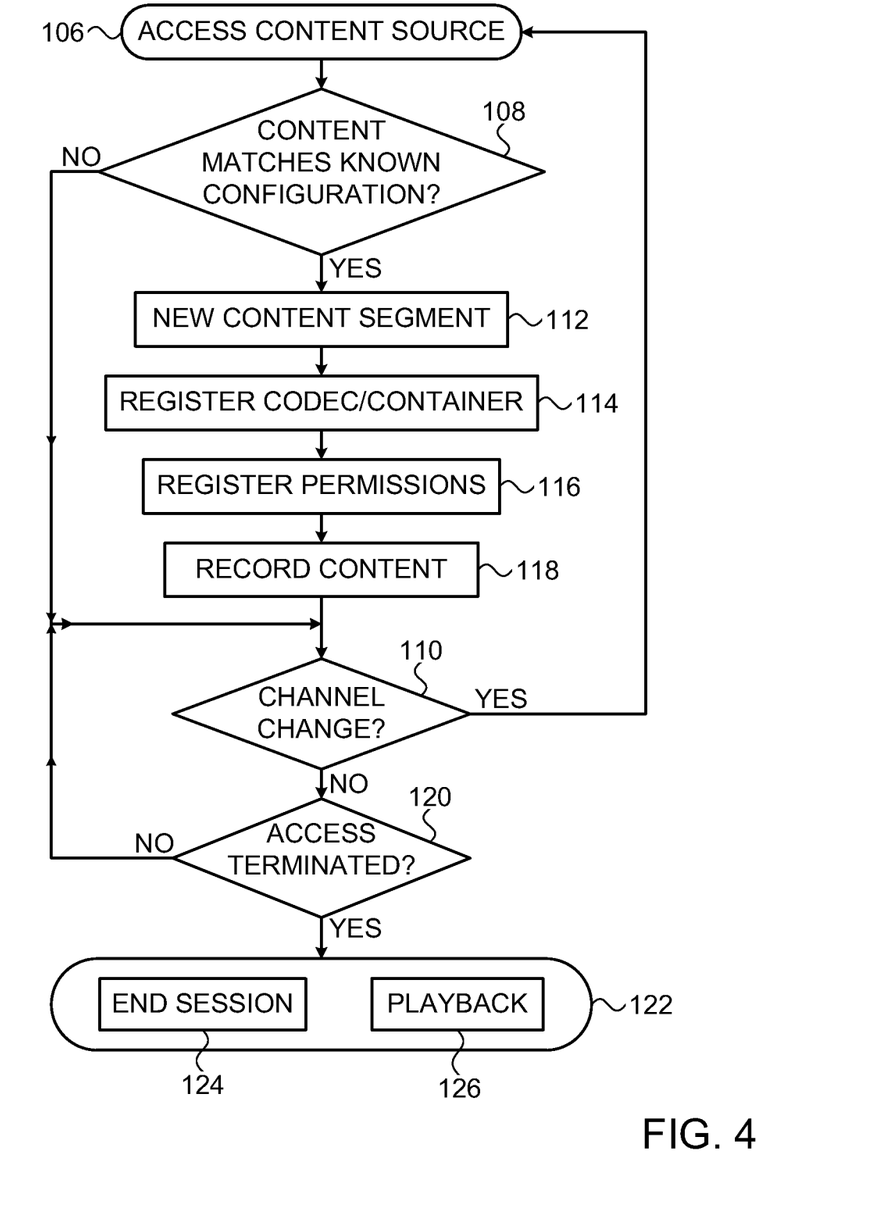
FIG. 4 is a flow chart of a method for managing a review buffer of a receiving device in accordance with an embodiment of the invention.

Reference is now made to FIG. 4, which is a flow chart of a method for managing a review buffer of a receiving device in accordance with an embodiment of the invention. The method is described with reference to the system 49 (FIG. 1) for convenience, but it is not limited to the arrangement of the system 49. The process steps are shown in a particular linear sequence in FIG. 4 for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the process.

At initial step 106 a user begins accesses a selected content source and begins receiving content. It is assumed for clarity of presentation that the receiving device has a single tuner, although the method may be practiced using several content sources. In the steps described below, the review buffer may be a single buffer. Alternatively, multiple review buffers may be used. In any case the review buffer or review buffers may be subdivided into content segments in many configurations.

Next, at decision step 108, it is determined if the selected content matches a known configuration, and can be processed in the review buffer in accordance with an available configuration rule, which specifies a codec/container for use in playback, and privileges that may be available under content protection schemes and licenses, if applicable. If the determination is negative, then the record buffer does not process the current content source. Control proceeds to decision step 110, which is described below.

If the determination at decision step 108 is affirmative, then control proceeds to step 112. A new content segment is established in the review buffer. A storage device for the new segment is selected. Each content segment in the review buffer may be stored on the device on which the content viewing was performed, or may contain a reference to content located on another network device.

Then, at step 114 a codec/container specified by the applicable configuration rule is registered in the new segment for use in subsequent playback. The information specified by the configuration rule may be stored, for example as a header, or in a program catalog database.

Next, as step 116 permissions for the content protection scheme, if any, specified in the applicable configuration rule are registered in the new segment. For example, there may be license expiration dates that apply, saving or copying prohibitions, or trick mode playback limitations. Different encryption schemes may require decryption. The system then records content at step 118, and may continue doing so until the review buffer is full. After that recording of new content continues, while the old content is deleted. The most recent content (e.g., 30-180 min) is generally retained. Which of the old content to delete may be a configuration option. For example, the oldest content may be deleted. Alternatively, content segments associated with content sources that have been assigned low priorities may be preferentially deleted. In any case, content (either part of a segment or an entire segment) is removed from the review buffer according to configurable content removal rules, based on e.g., duration, segment order, and classification of program, system standby or restart.

Next, at decision step 110, it is determined if the user has executed a content source change operation. If the determination is affirmative, then control returns to initial step 106. The current content segment of the review buffer is delimited, i.e., its end points are marked, and the content source of the new channel is processed. Typically, recording a new content segment begins within a configurable time, e.g., 10 seconds after live viewing is begun by the user following some non-viewing activity. Some delay is sometimes desirable to avoid uninteresting accumulations of content segments in the review buffer during channel "zapping", i.e., a rapid succession of channel changes while searching for a channel of interest. However, the delay may be overridden by the user, in which case review buffer operation begins immediately. Moreover, unless instructed otherwise, the system discards review buffer content recorded since the previous channel change (or initiation of a session) if the duration of the recording is less than some predetermined time, typically 60 seconds. Otherwise, no trimming or deletion of previously recorded content occurs, as long as the review buffer is not full.

If the determination at decision step 110 is negative, then control proceeds to decision step 120, where it is determined if content source access has been terminated. For example, the user may have terminated live viewing in order to enter into some non-viewing activity. If the determination is affirmative, then control proceeds to final step 122, where review buffer recording is discontinued. Final step 122 may include session termination in step 124 where the contents of the review buffer are stored in accordance with a governing policy. In some cases the contents of the review buffer may simply persist until otherwise deleted, either explicitly or by entering a standby mode or executing a system restart. In other case the contents may be transferred to designated storage units, which may be specified in the configuration rules. Alternatively, a management module may determine where the content is to be stored and initiate the necessary transfer operation. The content may be stored in conventional files, or in virtual file systems, which may be distributed among different storage devices as noted above.

Alternatively, in final step 122 the user may execute playback of the review buffer, which is performed in step 126. The details of playback are discussed below. Playback may occur while recording or afterward.

If the determination at decision step 120 is negative, then control returns to decision step 110.

Figure 5:
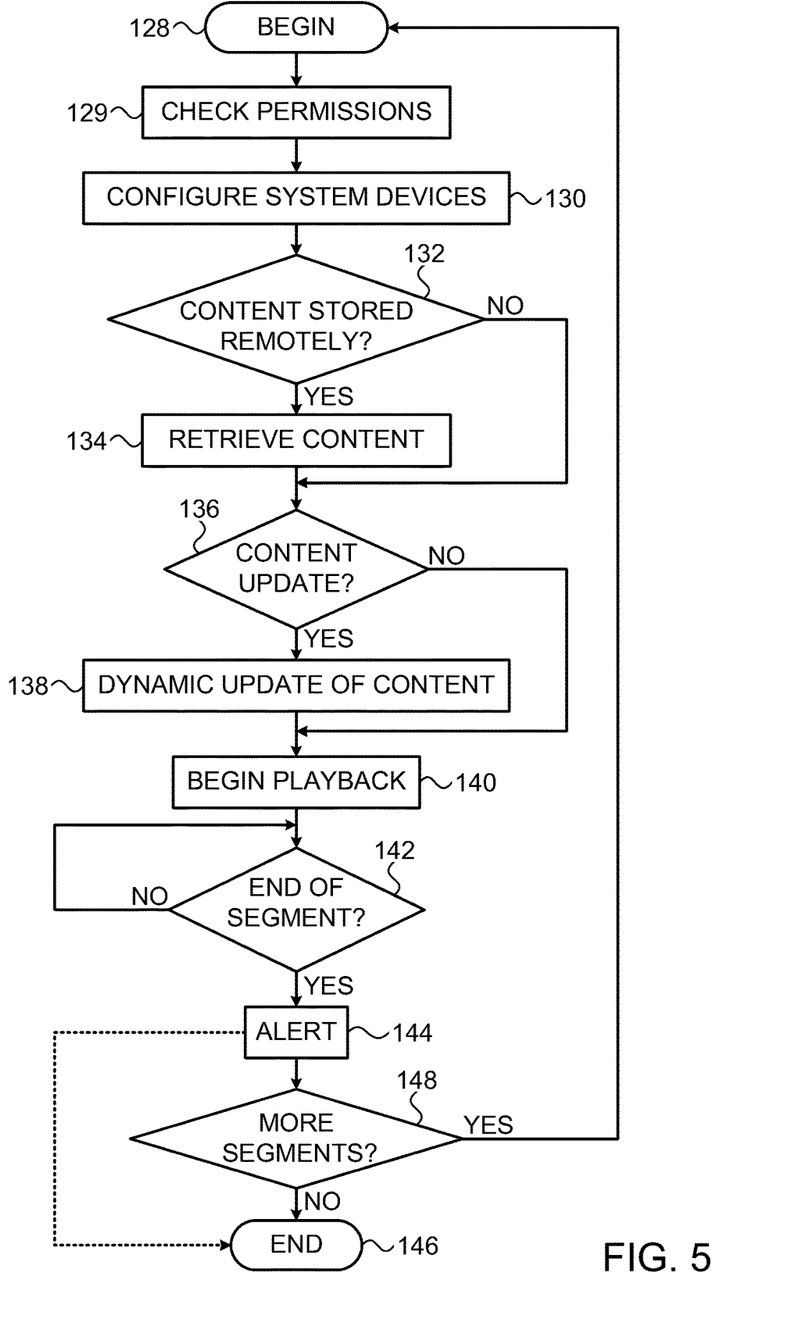
FIG. 5 is a flow chart illustrating a method of playback of a review buffer of a receiving device in accordance with an embodiment of the invention.

Reference is now made to FIG. 5, which is a flow chart illustrating a method of playback of a review buffer on a receiving device in accordance with an embodiment of the invention. Playback may apply to a complete recording, a partial recording, a recording in progress, and other content of the review buffer. Playback may occur in normal viewing mode or in a variety of trick modes, subject to device capabilities and trick mode permissions.

At initial step 128 playback of a new content segment is begun. Playback occurs in the order or in the reverse order that content segments were added to the review buffer, according to the direction of playback. The process usually begins at the most recently added content segment in the review buffer. However, the user may be allowed to choose an initial segment for playback (or other user operations), to specify a position within an initial segment or to navigate among segments.

Next, at step 129, it is verified that necessary content segment permissions to allow playback exist. Then, at step 130 system devices are configured according to the segment codec/container, and the usage rules. Content protection mechanisms of the segment are applied.

Next, at decision step 132, it is determined if the content is stored remotely from the play back system, e.g., at another device on a network. If the determination is affirmative, then control proceeds to step 134, where all or part of the content is retrieved, using an appropriate network protocol.

After completion of step 134, or in the event that the determination at decision step 132 is negative, at decision step 136 it is determined if there is updatable content in the current content segment. Certain types of content are vulnerable to becoming stale, but can be dynamically updated, for example by accessing a reference to the content via a data network, such as the Internet.

If the determination at decision step 136 is affirmative, then control proceeds to step 138, and such content is dynamically updated prior to presentation to the user. This may occur, for example, by accessing a link to a content source on the Internet, or a source that may be stored locally.

After completion of step 138, or if the determination at decision step 136 is negative, then control proceeds to step 140, where actual playback begins.

Control now proceeds to delay step 142 to await completion of playback of the current content segment. Then, at step 144, the user may be alerted that the current content segment has completed. At this step there also may be an indication to the user that a new segment is about to be played back, or that no more segments are available. Normally all segments are played automatically. However, the user may elect to continue with the next segment, select another segment or discontinue playback. In the latter case control proceeds directly to final step 146. Alternatively, if the system has been so configured, step 144 may be omitted entirely.

After completion of step 144, control proceeds to decision step 148, where it is determined if more content segments are available in the review buffer to be played back. If the determination is affirmative, then control returns to initial step 128, and the process iterates.

If the determination at decision step 148 is negative, then control proceeds to final step 146, and the process terminates.

Alternative Embodiment

Figure 6:
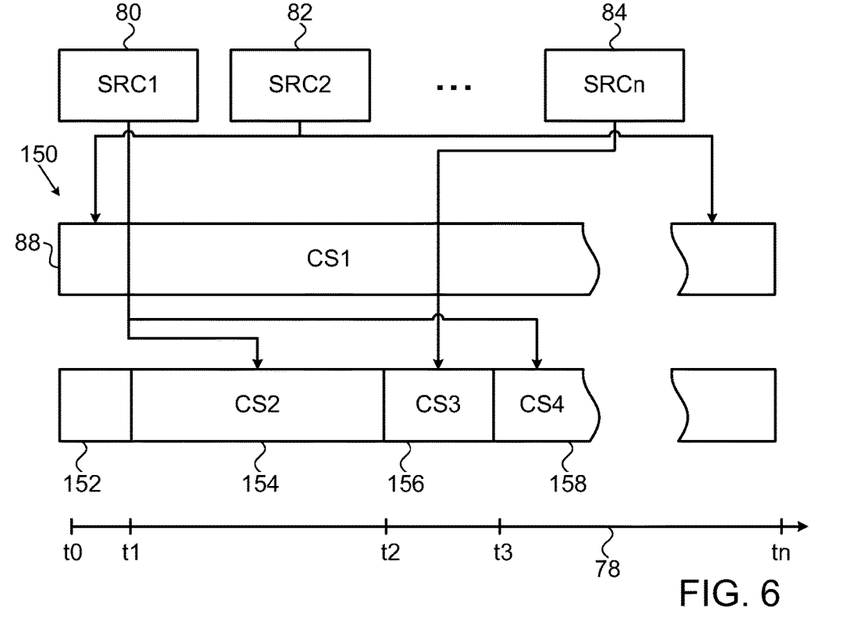
FIG. 6 is a schematic diagram of an exemplary review buffer arrangement, which is constructed and operative in accordance with an embodiment of the invention.

Reference is now made to FIG. 6, which is a schematic diagram of an exemplary review buffer arrangement 150, which is constructed and operative in accordance with an alternate embodiment of the invention. The arrangement 150 is similar to the arrangement 76 (FIG. 3), except now, besides the review buffer 88, there is a second review buffer 152. Typically, the review buffer 152 is managed for another user viewing session, which may occur on the recording device or on another viewing device. It is to be assumed that the same sequence of channel changing events applies as described with reference to FIG. 3. Content source 82 (CS1) is stored in review buffer 88 as described above with reference to FIG. 3. However, at time t1, the user has instructed the receiving device to continue recording content source 82 while viewing content source 80 from time t1 to time t3. Additionally or alternatively, at time t1 another user has instructed the receiving device to begin viewing content source 80 from time t1 until time t3. In either mode of operation content segment 154 (CS2) is stored in review buffer 152. Content segments 156 (CS3) and content segment 158 (CS4) are also stored in review buffer 152. Either of the review buffers 88, 152 may be chosen for playback, using the method described above with reference to FIG. 5.

While not shown in FIG. 6, additional review buffers may be provided to enable an even greater number of channels to be simultaneously recorded in systems that are capable of simultaneous access to multiple content sources.

Figure 7:
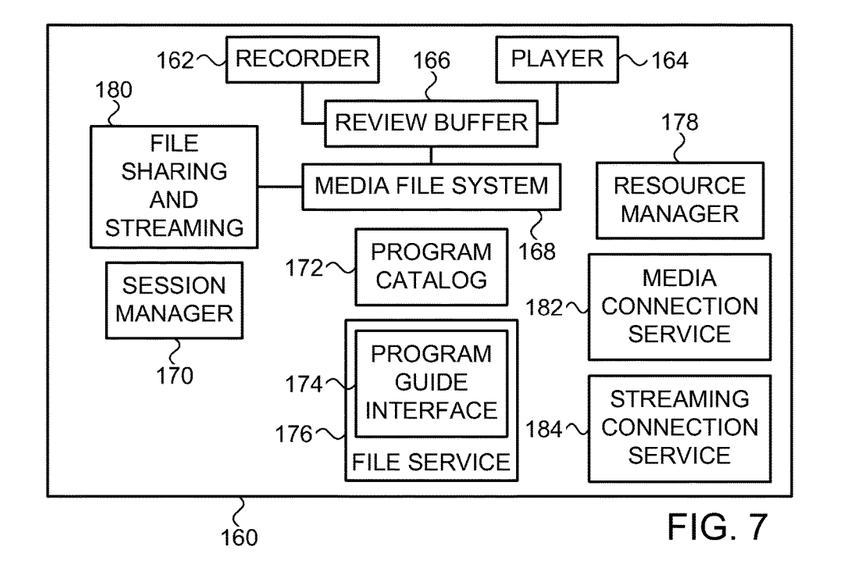
FIG. 7 is a functional block diagram of a recording and playback system in accordance with an embodiment of the invention.

Reference is now made to FIG. 7, which is a functional block diagram of a recording and playback system 160, in accordance with an embodiment of the invention. Elements of the system 160 may comprise a computer processor, which is suitably programmed for carrying out the functions described hereinbelow. Thus, although portions of the system 160 shown in FIG. 7 are shown as comprising a number of separate functional blocks, these blocks are not necessarily separate physical entities, but rather may represent, for example, different computing tasks or data objects stored in a memory that is accessible to the processor. These tasks may be carried out in software running on a single processor, or on multiple processors. The software may be provided to the processor or processors on tangible media, such as CD-ROM or non-volatile memory. Alternatively or additionally, the system 160 may comprise a digital signal processor or hard-wired logic.

The system 160 includes a recorder 162, a player 164 for playback of recorded content, a review buffer 166, and a media file system 168 for storage and retrieval of recorded content. These components are operative according to the methods disclosed above with reference to FIG. 3, FIG. 4 and FIG. 5. The system 160 further includes a session manager 170, which determines the conditions under which a recording and playback session can occur, according to applicable permissions. Storage of content in the review buffer 166 and media file system 168 is coordinated with a program catalog 172, which operates in coordination with a program guide interface 174. The program guide interface 174 may provide graphic information relating to content in the program catalog 172 (PCAT). In this embodiment, the program guide interface 174 is executed via a file service program 176 System resources for recording and playback are managed by a resource manager 178. Operation of the media file system 168 is coordinated by a file sharing manager 180, which may support virtual files (VF) in the media file system 168. A media connection service 182 synchronizes connections with various storage devices and the media file system 168, in cooperation with a streaming connection service 184 and the file sharing manager 180.

EXAMPLES

The following examples are illustrated with reference to elements of the system 160 (FIG. 7).

Figure 8:
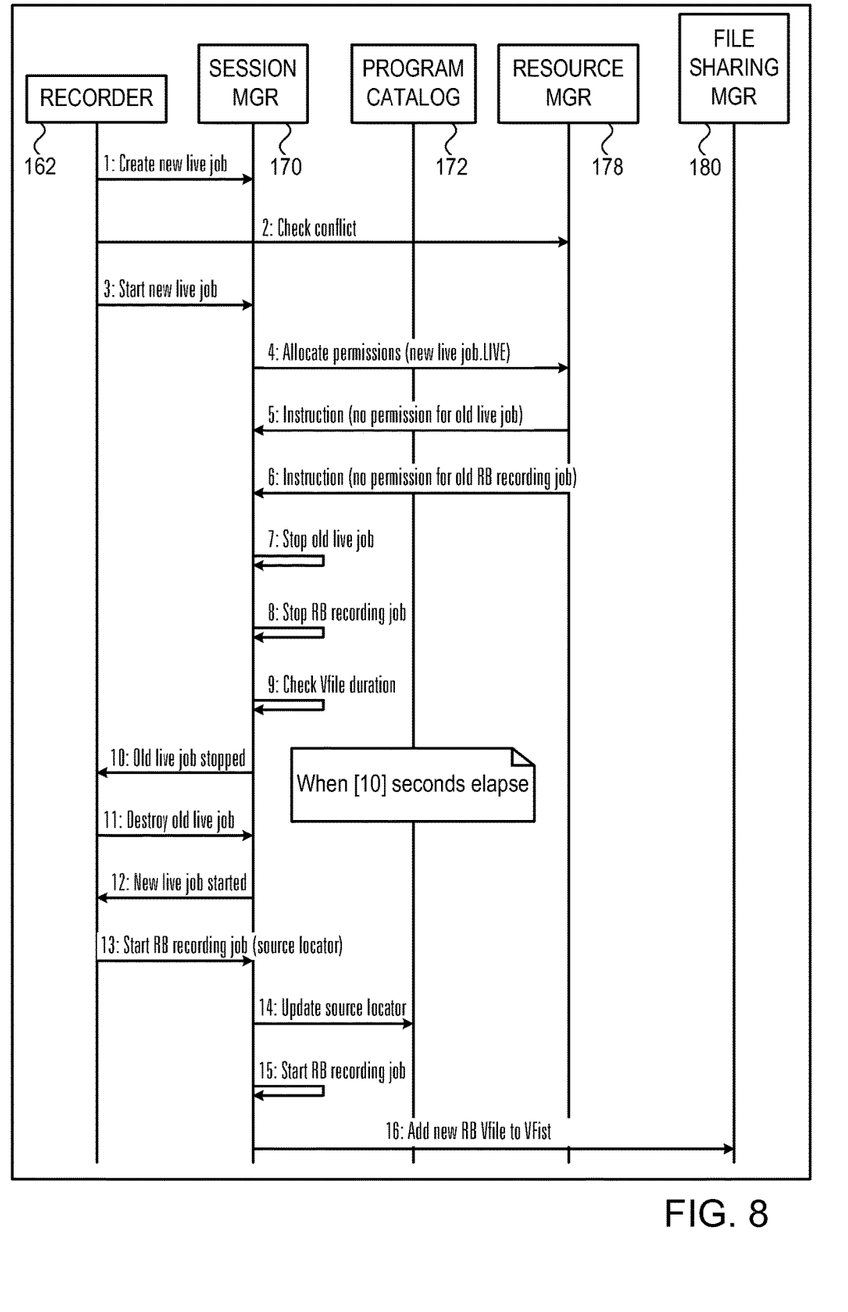
FIG. 8 is an event diagram illustrating a channel change operation, in accordance with the embodiment of the invention shown in FIG. 7.

Reference is now made to FIG. 8, which is an event diagram illustrating a content source change operation, in accordance with an embodiment of the invention. Coordination of the recorder 162, session manager 170, program catalog 172, resource manager 178 and file sharing manager 180 is shown.

Figure 9:
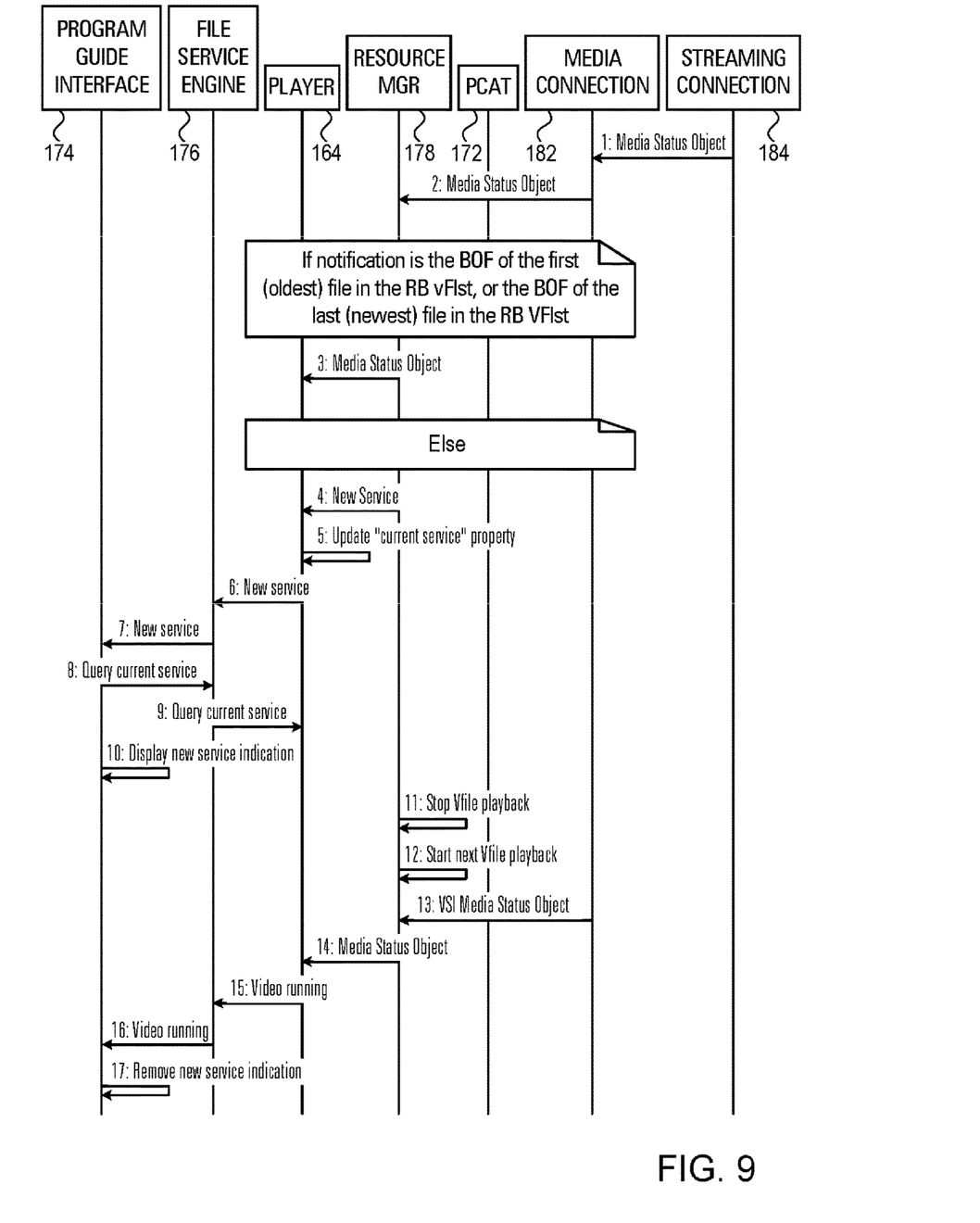
FIG. 9 is an event diagram illustrating a playback operation, in accordance with the embodiment of the invention shown in FIG. 7.

Reference is now made to FIG. 9, which is an event diagram illustrating a playback operation, in accordance with an embodiment of the invention. Coordination among the program guide interface 174, engine 176, player 164, resource manager 178, program catalog 172, media connection service 182 and streaming connection service 184 is shown.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method comprising:
providing a review buffer in a receiving device;
selecting one of a plurality of digital content streams, the content streams having respective distribution arrangements, each distribution arrangement comprising one or more of the following:
a video compression format; a content protection scheme; and an encryption algorithm with which content in the content stream is encrypted;
establishing a content segment of the review buffer for the one content stream;
determining that the one content stream matches a known configuration and configuring the content segment in accordance with the distribution arrangement of the one content stream, in accordance with a rule associated with the known configuration of the one content stream, the rule specifying a codec and a container for use in playback;
recording the one content stream in the review buffer,
while recording, executing a content source change operation to record another of the content streams in the review buffer by:
discontinuing recording of the one content stream;
delimiting the content segment; and
using a new content segment as the content segment and using the other content stream as the one content stream, iterating: the establishing a content segment; the configuring the content segment; and the recording;
storing the content segment and the new content segment in respective data stores; and
playing back the content streams in an order of or a reverse order of recording thereof by retrieving data from respective content segments of the review buffer or from the respective data stores,
wherein the review buffer comprises a plurality of review buffers having respective recorded content streams and the playing back comprises, for each of the review buffers and their respective recorded content streams, configuring a playback device to conform to the distribution arrangement of a current content stream responsively to a configuration of a current content segment.

2. The method according to claim 1, and also comprising:
deleting part or all of a previously-recorded content segment in accordance with configurable content removal rules.

3. The method according to claim 1, and wherein the playing back comprises playing back the content streams automatically, without requiring a user selection.

4. The method according to claim 1, wherein the recording and playing back are performed on a recording device and a content consumption device, respectively, wherein the recording device and the content consumption device are separate from one another.

5. The method according to claim 1, wherein a portion of the content streams originate from sources that are located in the receiving device or another device that is accessible to the receiving device via a data network or via a direct connection.

6. The method according to claim 1, wherein the respective data stores are accessed using a virtual file system.

7. The method according to claim 1, further comprising recording a third one of the content streams in a second review buffer while iteratively performing the recording the one content stream.

8. The method according to claim 1, further comprising:
dynamically updating the retrieved data via a data network; and
displaying the updated data.

9. The method according to claim 1, wherein a portion of the data stores are remote from the receiving device.

10. A recording apparatus, comprising:
a memory, configured as a review buffer for storing received data;
a processor, comprising logic circuitry for coordinating memory accesses in the review buffer, wherein the processor is cooperative with the memory for performing a method comprising:
selecting one of the content streams;
establishing a content segment of the review buffer for the one content stream;
determining that the one content stream matches a known configuration and configuring the content segment in accordance with a distribution arrangement of the one content stream in accordance with a rule associated with the known configuration of the one content stream, the rule comprising a codec and a container for use in playback, the distribution arrangement comprising one or more of the following:
a video compression format; a content protection scheme; and an encryption algorithm with which content in the content stream is encrypted;
recording the one content stream in the review buffer;
while recording, executing a content source change operation to record another of the content streams in the review buffer by:
discontinuing recording of the one content stream;
delimiting the content segment; and
using a new content segment as the content segment and using the other content stream as the one content stream, iterating: the establishing a content segment; the configuring the content segment; and the recording;
storing the content segment and the new content segment in respective data stores; and
playing back the content streams in an order of or a reverse order of recording thereof by retrieving data from respective content segments of the review buffer or from the respective data stores,
wherein the review buffer comprises a plurality of review buffers having respective recorded content streams and the playing back comprises, for each of the review buffers and their respective recorded content streams, configuring a playback device to conform to the distribution arrangement of a current content stream responsively to a configuration of a current content segment.

11. The apparatus according to claim 10 and wherein the method also comprises:
deleting part or all of a previously-recorded content segment in accordance with configurable content removal rules.

12. The apparatus according to claim 10, wherein a portion of the content streams originate from sources that are located in a recording device or another device that is accessible to the recording device via a data network or via a direct connection.

13. The apparatus according to claim 10, further comprising a virtual file system management circuit, wherein the respective data stores are accessed using a virtual file system.

14. The apparatus according to claim 10, wherein the method further comprises recording a third one of the content streams in a second review buffer while iteratively performing the recording the one content stream.

15. The apparatus according to claim 10, and wherein the playing back comprises playing back the content streams automatically, without requiring a user selection.

16. The apparatus according to claim 10, further comprising a content consumption device for playing back the content streams.

17. The apparatus according to claim 10, wherein the method further comprises:
dynamically updating the retrieved data via a data network; and
displaying the updated data.

18. The apparatus according to claim 10, wherein a portion of the data stores are remotely accessible via a network interface responsively to control signals from the processor.

19. The apparatus according to claim 10, further comprising:
a tuner for selection of the content sources, wherein the logic circuitry is operative for coordinating operations in the review buffer with tuner operations.

20. A recording apparatus, comprising:
means for storing received data;
means for coordinating memory accesses in the means for storing received data, wherein the means for coordinating memory accesses is cooperative with the means for storing received data, for performing a method comprising:
selecting one of the content streams;
establishing a content segment of the means for storing received data, for the one content stream;
determining that the one content stream matches a known configuration and configuring the content segment in accordance with a distribution arrangement of the one content stream in accordance with a rule associated with the known configuration of the one content stream, the rule comprising a codec and a container for use in playback, the distribution arrangement comprising one or more of the following:
a video compression format; a content protection scheme; and an encryption algorithm with which content in the content stream is encrypted;
recording the one content stream in the means for storing received data;
while recording, executing a content source change operation to record another of the content streams in the means for storing received data by:
discontinuing recording of the one content stream;
delimiting the content segment; and
using a new content segment as the content segment and using the other content stream as the one content stream, iterating: the establishing a content segment; the configuring the content segment; and the recording;
storing the content segment and the new content segment in respective data stores; and
playing back the content streams in an order of or a reverse order of recording thereof by retrieving data from respective content segments of the means for storing received data or from the respective data stores,
wherein the means for storing received data comprises a plurality of means for storing received data having respective recorded content streams and the playing back comprises, for each of the means for storing received data and their respective recorded content streams, configuring a playback device to conform to the distribution arrangement of a current content stream responsively to a configuration of a current content segment.

* * * * *

UNITED STATES PATENT AND TRADEMARK OFFICE
CERTIFICATE OF CORRECTION

PATENT NO. : 9,736,534 B2  
APPLICATION NO. : 14/436902  
DATED : August 15, 2017  
INVENTOR(S) : Dany Kharitonsky et al.

Page 1 of 1

It is certified that error appears in the above-identified patent and that said Letters Patent is hereby corrected as shown below:

In the Specification

Column 7, Line 12, "DATA2." to read as --DATA2,--.

In the Claims

Column 11, Line 39, Claim 1, "buffer," to read as --buffer;--.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*